United States Patent
Brown et al.

(10) Patent No.: US 7,017,706 B2
(45) Date of Patent: Mar. 28, 2006

(54) TURBINE NOISE ABSORBER

(75) Inventors: Daniel V. Brown, Glendale, AZ (US);
Sunil N. Sahay, Rolling Hills Estates, CA (US); Steven Don Arnold, Rancho Palos Verdes, CA (US)

(73) Assignee: Honeywell International, Inc., Morristown, NJ (US)

( * ) Notice: Subject to any disclaimer, the term of this patent is extended or adjusted under 35 U.S.C. 154(b) by 44 days.

(21) Appl. No.: 10/320,327

(22) Filed: Dec. 16, 2002

(65) Prior Publication Data
US 2003/0118762 A1    Jun. 26, 2003

Related U.S. Application Data

(60) Provisional application No. 60/344,943, filed on Dec. 21, 2001.

(51) Int. Cl.
| | |
|---|---|
| F01N 1/24 | (2006.01) |
| F01N 7/08 | (2006.01) |
| F01D 25/04 | (2006.01) |
| F03B 11/04 | (2006.01) |
| F04D 29/66 | (2006.01) |

(52) U.S. Cl. ............... 181/256; 181/252; 181/222; 181/225; 181/248; 415/119

(58) Field of Classification Search ............ 181/256, 181/252, 222, 248, 224–228, 247, 290, 294; 428/36.1, 36.5, 36.2; 415/119; 60/322, 60/687
See application file for complete search history.

(56) References Cited

U.S. PATENT DOCUMENTS

| | | | |
|---|---|---|---|
| 2,869,671 A | 1/1959 | Schlachter | |
| 3,941,206 A * | 3/1976 | Halter | 181/256 |
| 4,807,439 A * | 2/1989 | Hain et al. | 181/252 |
| 4,834,214 A | 5/1989 | Feuling | |
| 4,969,536 A * | 11/1990 | Allen | 181/225 |
| 5,014,815 A | 5/1991 | Arcas et al. | |
| 5,594,216 A * | 1/1997 | Yasukawa et al. | 181/294 |
| 5,777,947 A * | 7/1998 | Ahuja | 60/322 |
| 6,251,498 B1 * | 6/2001 | Fukushima et al. | 428/164 |
| 6,253,873 B1 * | 7/2001 | Norres et al. | 181/224 |
| 6,604,603 B1 * | 8/2003 | Wirth | 181/200 |
| 6,672,425 B1 * | 1/2004 | Simmons | 181/252 |

FOREIGN PATENT DOCUMENTS

| | | |
|---|---|---|
| DE | 4215046 A1 * | 11/1993 |
| DE | 19503748 A1 | 6/1996 |
| DE | 19818873 A1 | 11/1999 |
| EP | 0822322 A1 | 2/1998 |
| GB | 2024328 A | 1/1980 |
| JP | 58008216 | 1/1983 |
| JP | 09170494 | 6/1997 |

(Continued)

OTHER PUBLICATIONS

Banhart, John, "Manufacture, characterisation and application of cellular metals and metal foams," Progress in Materials Science 46 (2001) 559-632, 7 pages.

(Continued)

*Primary Examiner*—Edgardo San Martin
(74) *Attorney, Agent, or Firm*—Chris James

(57) ABSTRACT

Exemplary methods, devices and/or system for reducing noise produced by a turbine, such as, a turbocharger turbine. An exemplary exhaust conduit employs material to absorb exhaust-borne noise and/or structure-borne noise. Another exemplary exhaust conduit employs features that dampen wall vibration.

26 Claims, 8 Drawing Sheets

FOREIGN PATENT DOCUMENTS

WO    WO 01/94754 A1    12/2001

OTHER PUBLICATIONS

Stefani, Gunter, "New Processes, Products & Their Applications, Part 2: Porous Materials & Metallic Foams," 2002 World Congress on Powder Metallurgy & Particulate Materials, Jun. 16-21, 2002, Orlando, Florida, 5 pages.

Automotive Engineering International Online: Tech Briefs, "T-Bird hardtop from Venture," http:///www.sae.org/automag/techbriefs/10-2001/page3.htm, Oct. 2001, 6 pages.

* cited by examiner

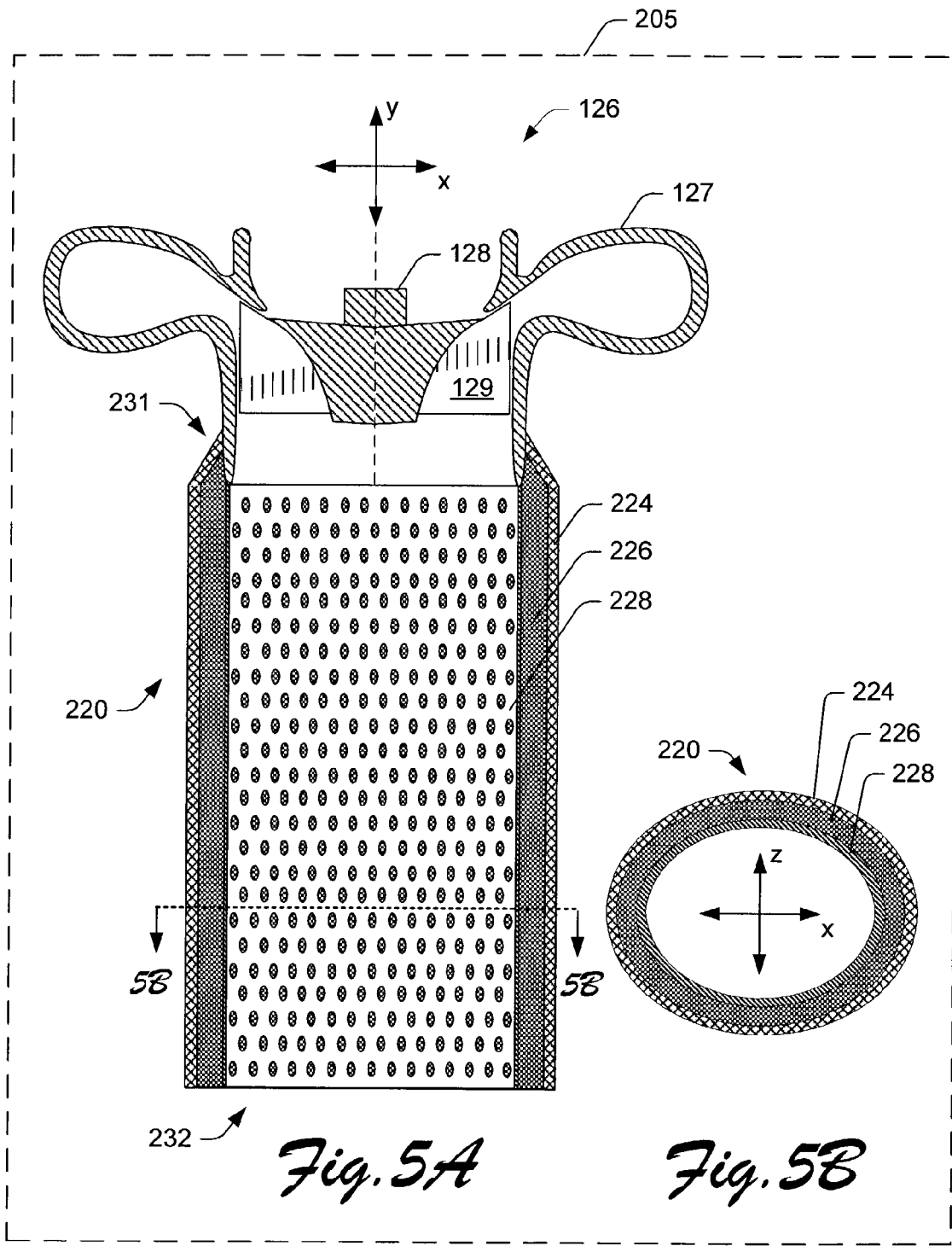

ABSORBER

REFERENCE TO PROVISIONAL APPLICATION

This application claims the benefit of a provisional application entitled "Pulse absorber for high frequency turbine noise", to inventors Daniel Brown, Sunil Sahay, and Steven Arnold, assigned to Honeywell, Inc., filed Dec. 21, 2001 and having U.S. Ser. No. 60/344,943.

TECHNICAL FIELD

Subject matter disclosed herein relates generally to methods, devices, and/or systems for reduction of exhaust turbine noise.

BACKGROUND

A typical exhaust turbine includes a turbine wheel positioned in a turbine housing. To extract energy from exhaust, the turbine housing directs exhaust to the turbine wheel, which in turn causes the turbine wheel to rotate. However, interactions between exhaust, the housing and the wheel also generate undesirable noise. For example, interactions between turbine wheel blades and exhaust are known to generate undesirable noise having frequencies, for example, greater than approximately 5,000 Hz. Sometimes this high frequency noise is referred to as vane pass or blade pass noise, which typically depends on rotational speed, which may vary, and number of blades on a turbine wheel, which is constant. Thus, such noise may have a characteristic frequency (e.g., blade pass frequency) that varies with respect to rotational speed. Because turbine noise stems from interaction with a gas, it inherently has a significant "air borne" component which can be quickly transmitted via an exhaust system. Consequently, a need exists for methods, devices and/or systems to reduce high frequency turbine noise, especially before such noise travels to other environments or transfers to surrounding structures. Methods, devices and/or systems capable of reducing such noise are described below.

BRIEF DESCRIPTION OF THE DRAWINGS

A more complete understanding of the various methods, devices and/or systems described herein, and equivalents thereof, may be had by reference to the following detailed description when taken in conjunction with the accompanying drawings wherein:

FIG. 5A is an approximate cross-sectional view of an exemplary absorber fit onto an exhaust outlet of a turbine housing and FIG. 5B is another cross-sectional view of the exemplary absorber.

DETAILED DESCRIPTION

Figure 1:
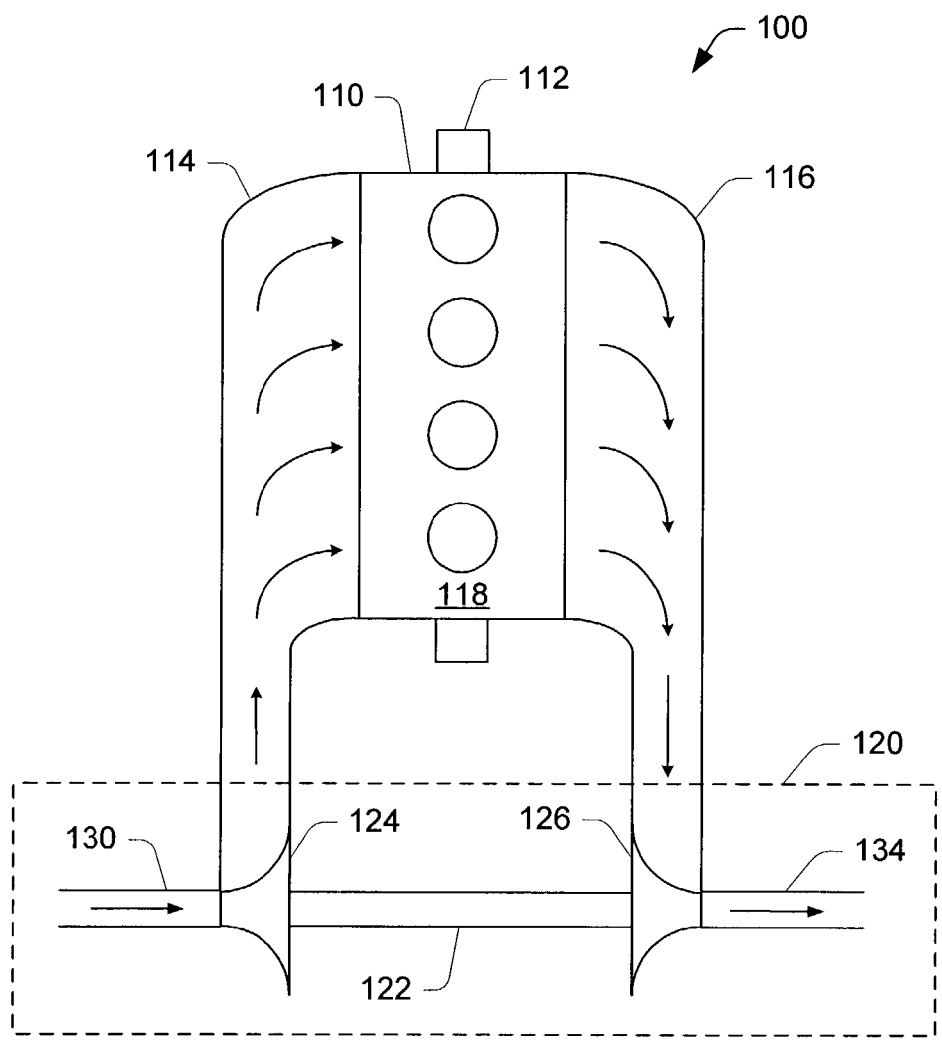
FIG. 1 is an approximate diagram of a turbocharged internal combustion engine.

Turbochargers are frequently utilized to increase the output of an internal combustion engine. Referring to FIG. 1, an exemplary system 100, including an exemplary turbocharger 120 and an exemplary internal combustion engine 110, is shown. The internal combustion engine 110 includes an engine block 118 housing one or more combustion chambers that operatively drive a shaft 112. As shown in FIG. 1, an intake port 114 provides a flow path for combustion gas (e.g., air) or intake charge to the engine block while an exhaust port 116 provides a flow path for exhaust from the engine block 118.

The exemplary turbocharger 120 acts to extract energy from the exhaust and to provide energy to the intake charge. As shown in FIG. 1, the turbocharger 120 includes an intake charge inlet 130, a shaft 122 having a compressor 124, a turbine 126 and an exhaust outlet 134, which is typically a metal exhaust pipe. During operation, exhaust from the engine 110 diverted to the turbine 126 causes the shaft 122 to rotate, which, in turn, rotates the compressor 124. The compressor 124 when rotating energizes combustion gas (e.g., ambient air) to produces a "boost" in the intake charge pressure (e.g., force per unit area or energy per unit volume), which is commonly referred to as "boost pressure." In this manner, a turbocharger may help to provide a larger intake charge mass (typically mixed with a carbon-based and/or hydrogen-based fuel) to the engine, which translates to greater engine output during combustion.

Figure 2:
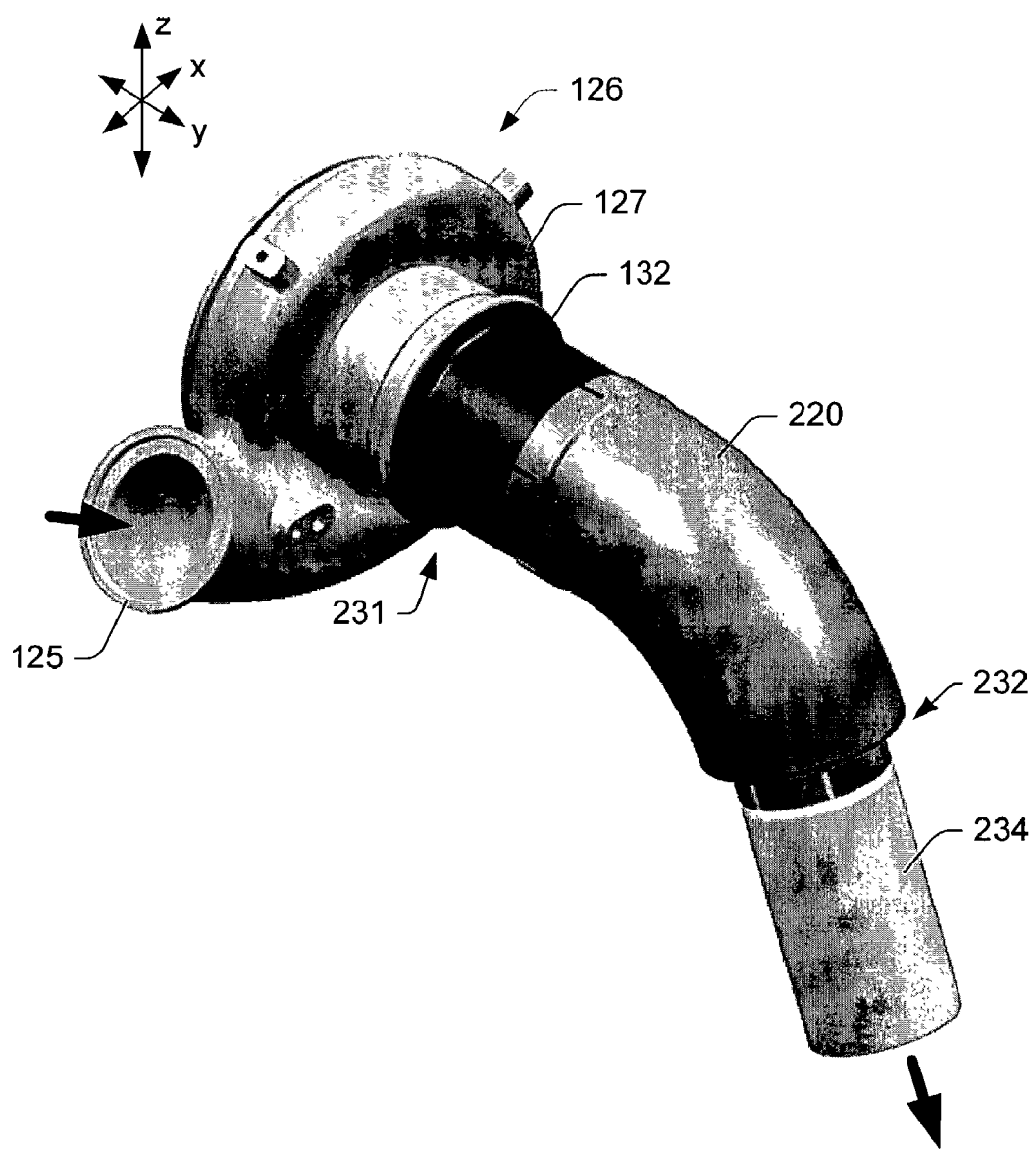
FIG. 2 is an approximate perspective view of a turbine, an exemplary absorber conduit, and another exhaust conduit.

FIG. 2 shows a perspective view of a turbine 126, an absorber 220 and an exhaust conduit 234. The turbine 126 has a turbine housing 127 with an exhaust inlet 125 and an exhaust outlet 132. The turbine housing 127 houses a turbine wheel (not shown) having one or more blades or vanes. The turbine housing also has an exhaust inlet 125, for example, configured to receive exhaust from an exhaust port (e.g., the exhaust port 116 of FIG. 1) of an internal combustion engine. The absorber 220 is also an exhaust conduit and has a plurality of conduit layers, such as, but not limited to, one or more inner conduit layers and an outer conduit layer. The absorber 220 also has a proximal end 231 and a distal end 232. The absorber connects to the turbine housing 127 at or near its proximal end 231 to receive exhaust from the exhaust outlet 132. The distal end 232 may connect to a subsequent exhaust conduit, e.g., the exhaust conduit 234. As described herein, the absorber 220 reduces turbine generated noise via absorption of sound waves and/or damping of structural vibration (e.g., wall vibration, etc.). In absorption, pressure energy is typically converted to heat energy by friction between gas molecules and an absorptive material. In damping, reduction of vibration amplitudes of a turbine housing and/or an exhaust conduit occur due to addition of mass and, for example, addition of an inner perforated conduit (e.g., a perforated metal sleeve, etc.).

Figures 3A, 3B:
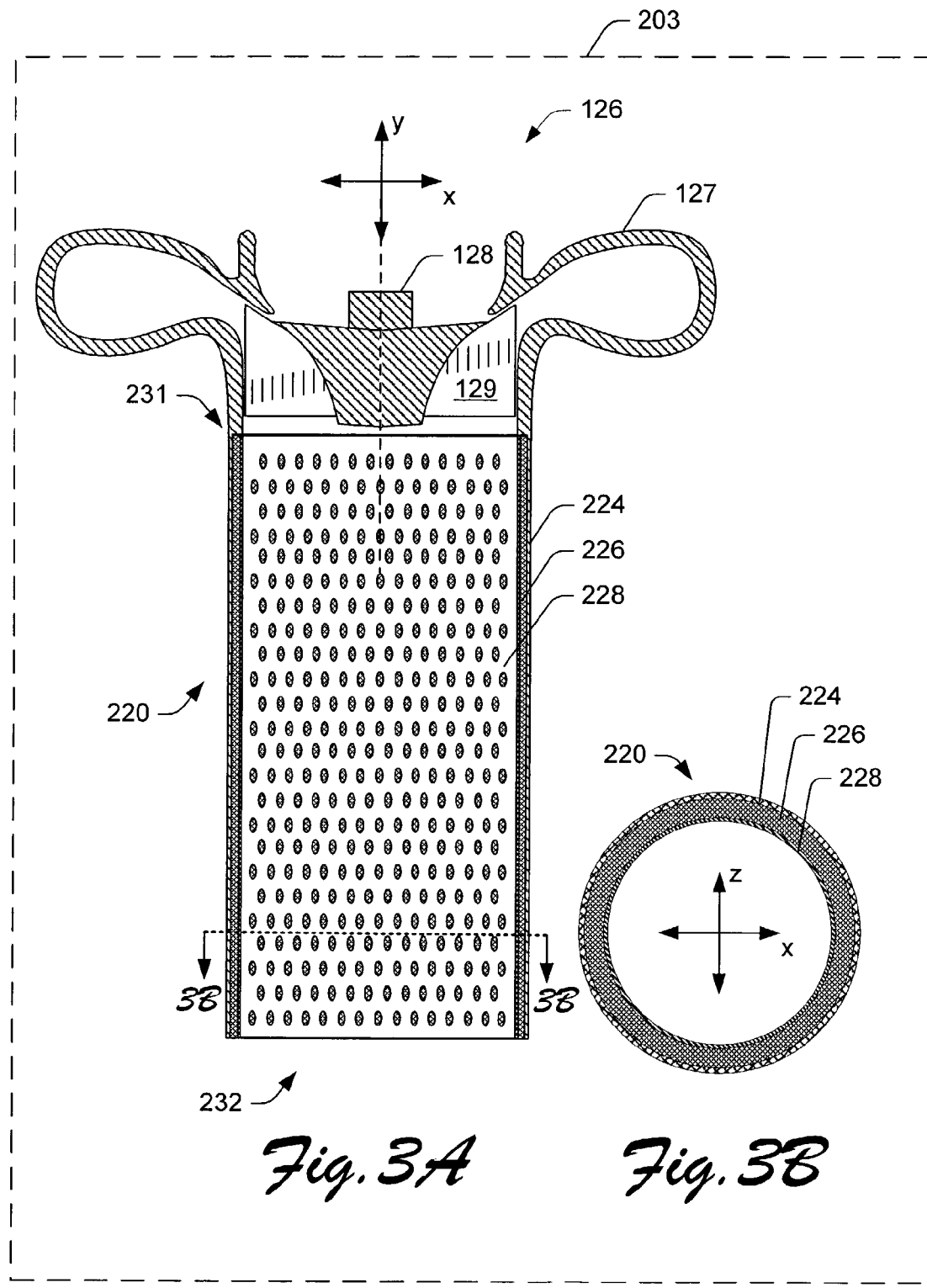
FIG. 3A is an approximate cross-sectional view of an exemplary absorber integral with a turbine housing and FIG. 3B is another cross-sectional view of the exemplary absorber portion of the turbine housing.

Referring to FIG. 3A, a cross-sectional view of an exemplary system 203 is shown that includes a turbine 126 and an integral noise absorber 220. The turbine 126 includes a turbine housing 127 and a turbine wheel 128 having one or more turbine blades 129. In this example, the turbine housing 127 has an integral exhaust outlet conduit 224 that forms part of the noise absorber 220. For example, the integral exhaust outlet conduit 224 may hold one or more inner layers to thereby form a noise absorber (e.g., the noise absorber 220). As shown in FIG. 3A, the integral exhaust outlet conduit 224 of the turbine housing 127 extends axially along the y-axis away from the turbine wheel 129 to a distal end 232, thereby forming part of the absorber 220. The thickness and/or axial cross-sectional dimension (e.g., diameter) of the integral exhaust outlet conduit 224 optionally vary along the y-axis. For example, at the proximal end 231 of the absorber 220, the annular thickness of the turbine housing 127 or integral exhaust outlet conduit 224 decreases to account for thickness of an inner absorptive material layer 226 and/or an inner perforated material layer 228, which is shown as an innermost layer. Alternatively, or in addition to a thickness change, the diameter of the turbine housing 127 or integral exhaust outlet conduit 224 may increase to accommodate the inner absorptive material layer 226 and/or the inner perforated layer 228. In general, the integral exhaust outlet conduit 224, the absorptive layer 226 and the perforated layer 228 are capable of withstanding temperatures of 1000 F (538 C) or greater. For example, the various layers 224, 226, 228 are composed of metal (e.g., stainless steel, titanium, etc.), ceramic, carbon, glass, and/or composite material, as described further below. In this particular example, stainless steel forms the integral exhaust outlet conduit or outer layer 224, woven stainless steel wire mesh forms the absorptive layer 226 and perforated stainless steel forms the inner layer 228.

Regarding absorber geometry, an absorber may have a variety of geometries depending on factors such as turbine housing, noise, engine compartment space, etc. The particular absorber 220 of FIG. 3A has a cylindrical geometry wherein the innermost layer 228, the inner layer 226 and the outer layer 224 are concentric cylinders, as shown in the axial cross-sectional view 220 of FIG. 3B. These three concentric cylinders are shown as being coextensive between the proximal and distal ends 231, 232; however, the outer layer 224 may extend beyond the distal ends of the inner layer 226 and/or the innermost layer 228.

Regarding operation of the absorber 220, the innermost layer 228 allows for transmission of pressure waves (e.g., sound waves), typically via perforations. Through proper design of the innermost layer 228 and the inner layer 226, pressure waves enter the inner layer 226, without substantial reflection by the innermost layer 228 and/or the inner layer 226. The inner layer 226 then absorbs the non-reflected pressure waves and the magnitude of the pressure waves decreases with distance along the y-axis of the absorber 220.

The frequency of sound waves most attenuated by such an absorber is related both to the radial depth and to the acoustic properties of the material in the inner layer 226. Sound waves will be absorbed most that produce the most movement of exhaust molecules within the material forming inner layer 226. In general, this condition correlates to all frequencies above that for which one quarter of the acoustic wavelength is equal to the radial depth of the inner layer 226. For example, if the inner layer 226 is 1 inch deep (2.5 cm), at an exhaust temperature of 1000 F (538 C), sound waves having frequencies near 5600 Hz, which may be referred to as the tuning frequency, will be absorbed most. When a bulk material is used to form the inner layer 226, broadband tuning (good absorption over a wide range of frequencies) is achieved. Even though absorption is greatest above frequencies having one-quarter wavelengths equal to or greater than the radial depth of inner layer 226, the broadband nature of a selected bulk material, or materials, makes the absorptive layer quite effective at much lower frequencies as well.

Reduction of the vibration levels of the conduit walls typically results in lower turbocharger noise levels in the cabin because exhaust conduit walls are often a dominant path for noise to propagate from the turbocharger turbine to the passenger cabin of a vehicle. Hence, an exemplary turbine noise absorber may reduce vibration of the conduit in at least two ways. According to a first way, as described above, an absorbent material reduces noise levels within an exhaust conduit such that the acoustic excitation forces acting on the walls are decreased. A second way relies on a change in the configuration of the conduit wall, for example, a double-walled duct typically transmits less acoustic energy through its walls than a single-walled duct. Various exemplary turbine noise absorbers described herein include multiple walls (e.g., double-walls, etc.) in addition to having absorbent material between the two or more walls. The absorber therefore provides lower excitation forces within the exhaust conduit and improved damping of acoustic propagation through the conduit walls. Other exemplary turbine noise absorbers described herein employ an absorbent material and an integral exhaust outlet conduit or outer wall only. For example, particular wire mesh material may serve as both an inner perforated wall and as an absorptive layer.

Figures 4A, 4B:
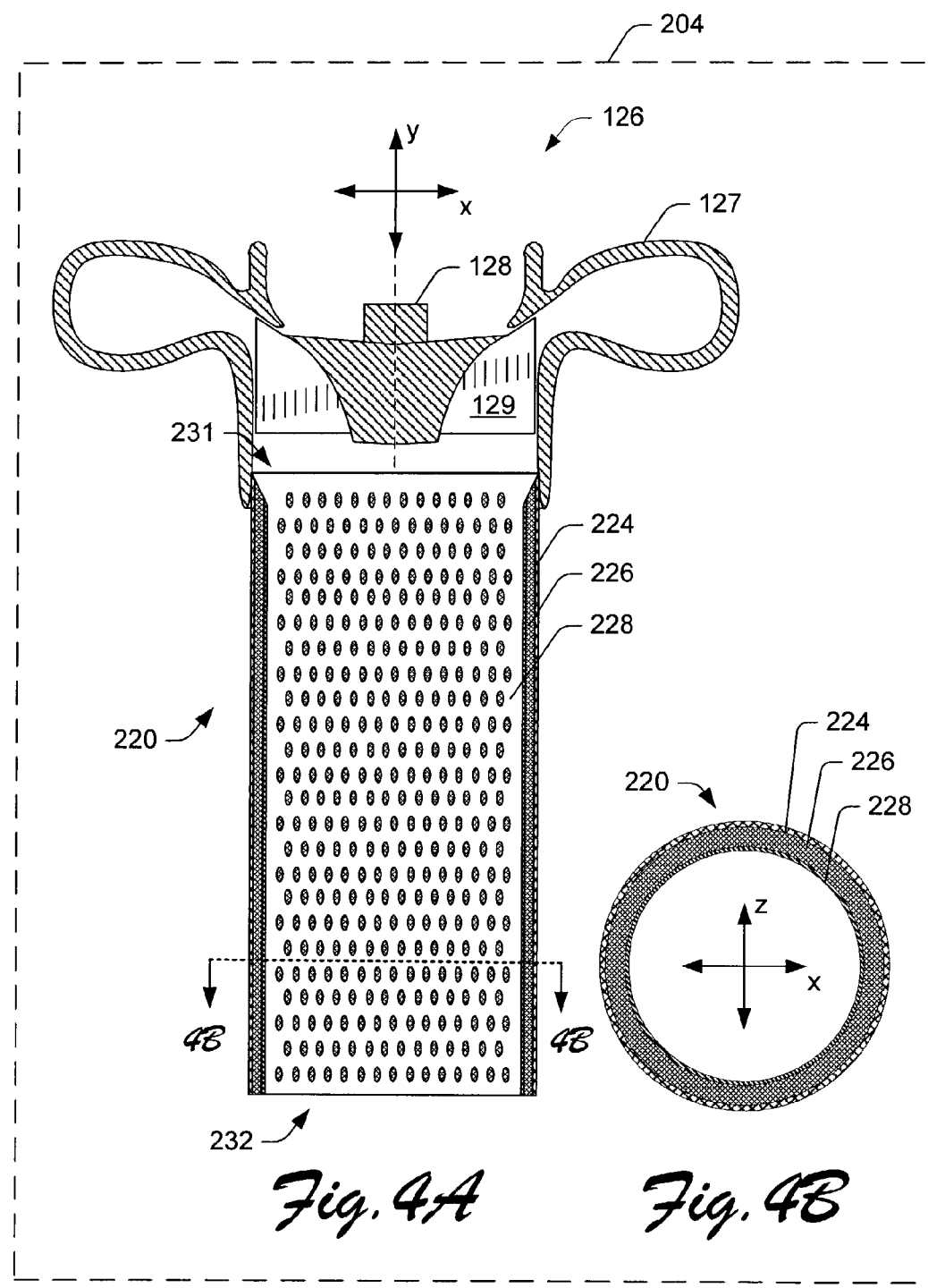
FIG. 4A is an approximate cross-sectional view of an exemplary absorber fit into an exhaust outlet of a turbine housing and FIG. 4B is another cross-sectional view of the exemplary absorber.

Referring to FIG. 4A, a cross-sectional view of an exemplary system 204 is shown that includes a turbine 126 and a noise absorber 220. The turbine 126 includes a turbine housing 127 and a turbine wheel 128 having one or more turbine blades 129. In this example, the absorber 220, which acts as an exhaust conduit, fits into the turbine housing 127 and is positioned proximate to the turbine wheel 128. An axial cross-sectional view of the absorber 220 is also shown in FIG. 4B. The absorber 220 has a proximal end 231 and a distal end 232, which may connect or attach to an exhaust system. The absorber 220 includes an outer layer 224, an inner layer 226 and an innermost layer 228 which are all capable of withstanding temperatures of 1000 F (538 C) or greater. For example, the various layers 224, 226, 228 are composed of metal (e.g., stainless steel, titanium, etc.), ceramic, carbon, glass, and/or composite material, as described further below. In this particular example, stainless steel forms the outer layer 224, woven stainless steel wire mesh forms the inner layer 226 and perforated stainless steel forms the innermost layer 228.

Regarding absorber geometry, an absorber may have a variety of geometries depending on factors such as turbine housing, noise, engine compartment space, etc. The particular absorber 220 of FIG. 4A has a cylindrical geometry wherein the innermost layer 228, the inner layer 226 and the outer layer 224 are concentric cylinders, as shown in the axial cross-sectional view 220 of FIG. 4B. While these three concentric cylinders are shown as being substantially coextensive, at the proximal end 231, the absorber 220 tapers in a manner that reduces flow disturbances (e.g., recirculation, separation, turbulence, etc.) between the turbine housing 127 and the absorber 220. Further, the outer layer 224 may have a connection or attachment means for connecting or attaching to the turbine housing 127. For example, the turbine housing 127 may receive the outer layer 224 via threads, blades, compression fitting, etc. The connection means may also allow for positioning of the absorber 220 proximate to the turbine wheel 128. For example, a threaded, bladed, or compression fit connection may allow for proper positioning of the proximal end 231 of the absorber in relation to the turbine wheel 128 to enhance absorber performance.

Referring to FIG. 5A, a cross-sectional view of another exemplary system 205 is shown that includes a turbine 126 and a noise absorber 220. The turbine 126 includes a turbine housing 127 and a turbine wheel 128 having one or more turbine blades 129. The absorber 220 fits onto the turbine housing 127 and is positioned proximate to the turbine wheel 128. An axial cross-sectional view of the absorber 220 is also shown in FIG. 5B. While this particular example has an elliptical axial cross-section, note that an exemplary absorber may have one or more axial cross-sections that are circular, elliptical, rectangular, etc. As with the aforementioned absorber, the absorber 220 has a proximal end 231 and a distal end 232, which may connect or attach to an exhaust system. The absorber 220 includes an outer layer 224, an inner layer 226 and an innermost layer 228 which are all capable of withstanding temperatures of 1000 F (538 C) or greater. For example, the various layers 224, 226, 228 are composed of metal (e.g., stainless steel, titanium, etc.), ceramic, carbon, glass, and/or composite material, as described further below. In this particular example, stainless steel forms the outer layer 224, reticulated ceramic foam forms the inner layer 226 and perforated stainless steel forms the innermost layer 228.

As shown in FIG. 5A, the absorber 220 fits onto the turbine housing 127 whereby one or more of the three layers has a dimension larger than that of the exhaust outlet of the turbine housing 127. In this particular example, the inner layer 226 and the outer layer 224 contact the outer surface of the turbine housing 127 while the innermost layer 228 matches the exhaust outlet of the turbine housing 127. In such examples, contact between the turbine housing 127 and the inner layer 226 may help to reduce structure borne transmission of noise. Of course, various other configurations are also possible, for example, the innermost layer 228 may fit into the exhaust outlet of the turbine housing 127, fit onto the outer surface of the exhaust outlet of the turbine housing 127, etc.

Figures 6A, 6B:
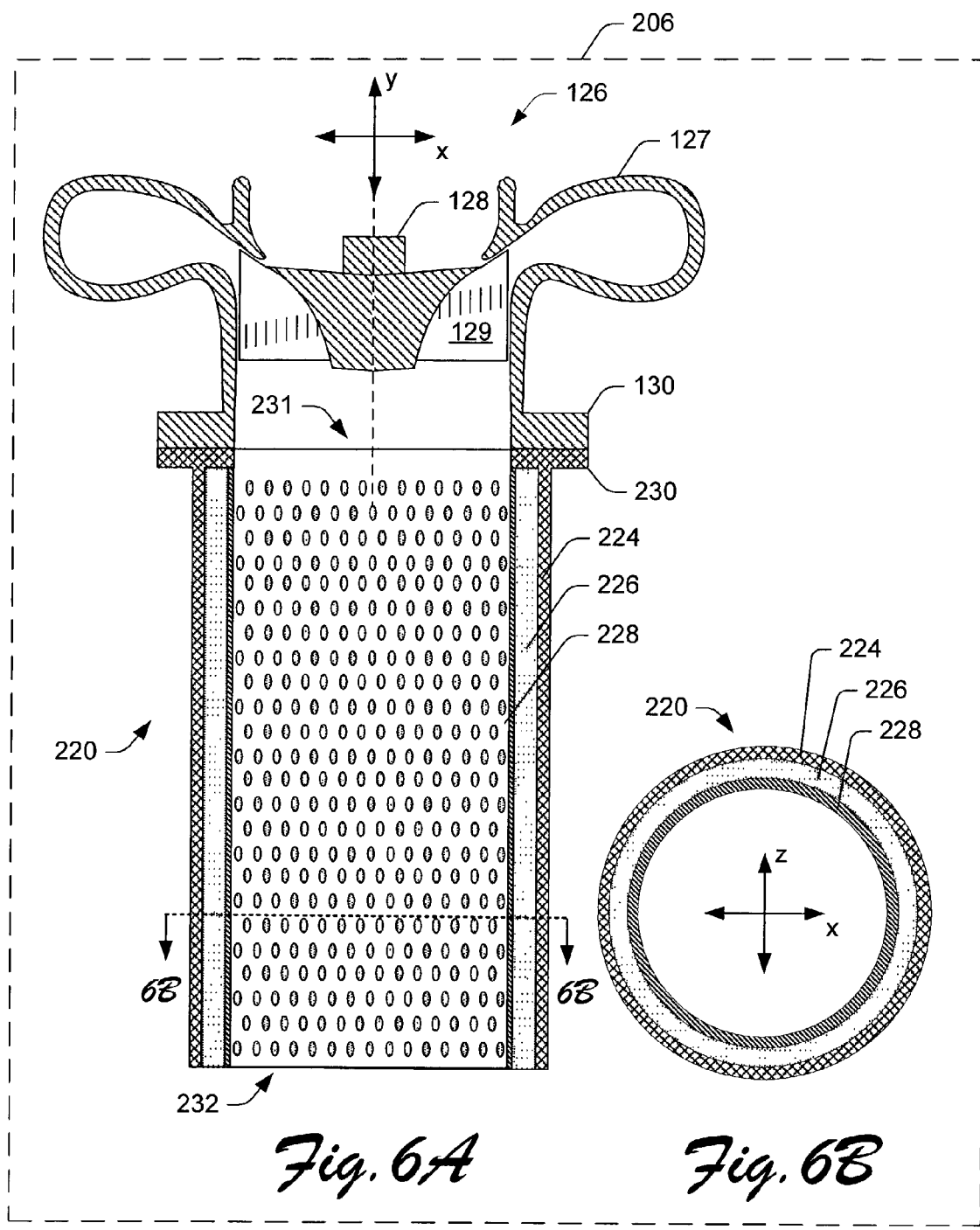
FIG. 6A is an approximate cross-sectional view of an exemplary absorber attached to an exhaust outlet of a turbine housing and FIG. 6B is another cross-sectional view of the exemplary absorber.

Yet another exemplary system 206 is shown in FIG. 6A. The system 206 includes a turbine 126 and a noise absorber 220. The turbine 126 includes a turbine housing 127 and a turbine wheel 128 having one or more turbine blades 129. The absorber 220 fits to the turbine housing 127 and is positioned proximate to the turbine wheel 128. An axial cross-sectional view of the absorber 220 is also shown in FIG. 6B. The absorber 220 has a proximal end 231 and a distal end 232, which may connect or attach to an exhaust system. The absorber 220 includes an outer layer 224, an inner layer 226 and an innermost layer 228 which are all capable of withstanding temperatures of 1000 F (538 C) or greater. For example, the various layers 224, 226, 228 are composed of metal (e.g., stainless steel, titanium, etc.), ceramic, carbon, glass, and/or composite material, as described further below. In this particular example, stainless steel forms the outer layer 224, porous ceramic spheres form the inner layer 226 and perforated stainless steel forms the innermost layer 228.

As shown in FIG. 6A, the absorber 220 attaches to the turbine housing 127 via a turbine flange 130 and an absorber flange 230. Flange attachments for attaching an absorber to a turbine housing may include use of gaskets, bonding material, bolts, etc.

Figures 7A, 7B:
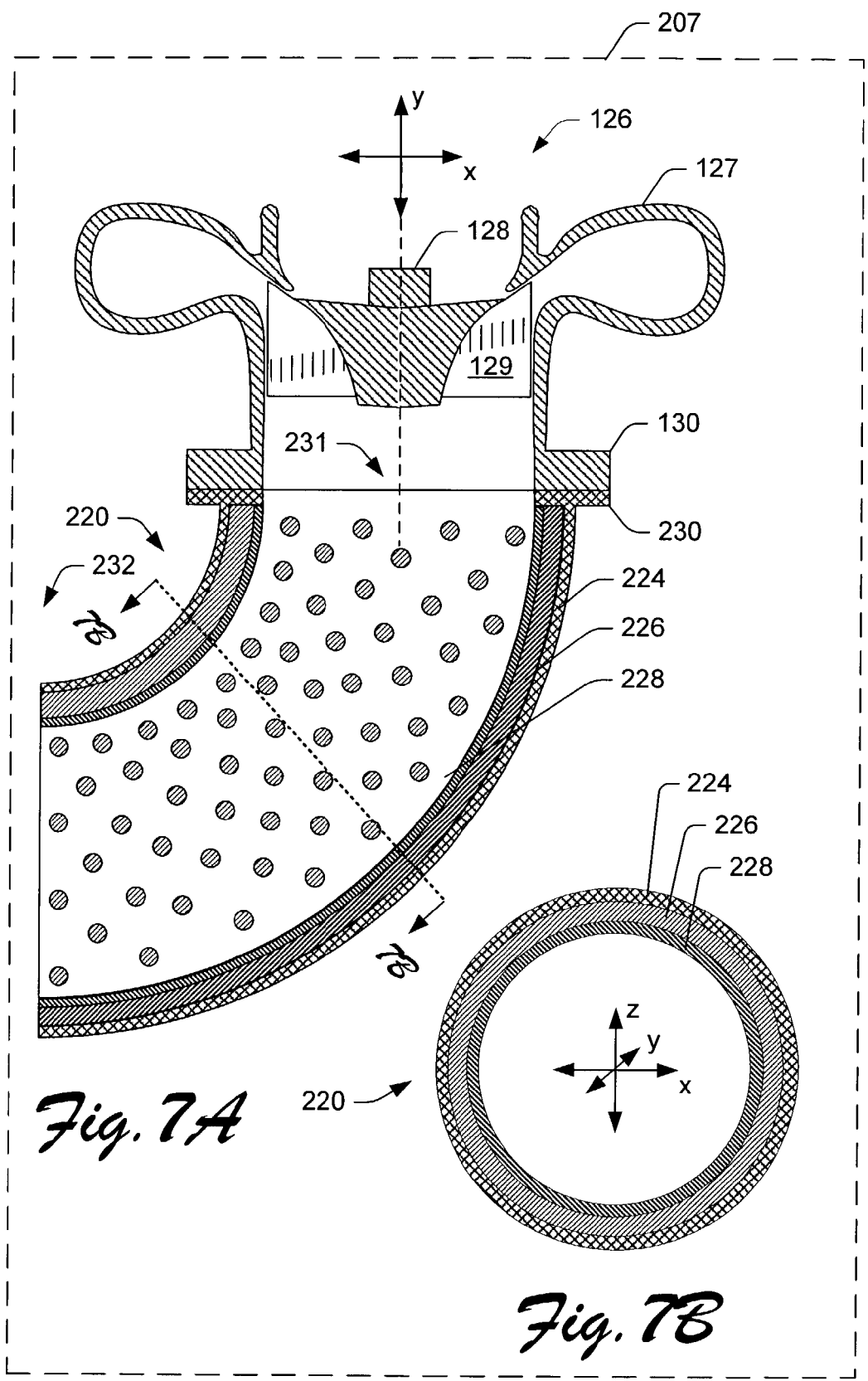
FIG. 7A is an approximate cross-sectional view of an exemplary curved absorber attached to an exhaust outlet of a turbine housing and FIG. 7B is another cross-sectional view of the exemplary absorber.

Often an engine compartment has limited space which can complicate turbine or turbocharger positioning; thus, an exemplary absorber may have a shape that aids in positioning and/or conforms to a standard exhaust pipe or a turbo down pipe. Referring to FIG. 7A, an exemplary system 207 is shown that includes a turbine 126 and a curved noise absorber 220. The turbine 126 includes a turbine housing 127 and a turbine wheel 128 having one or more turbine blades 129. The absorber 220 fits to the turbine housing 127 and is positioned proximate to the turbine wheel 128. An axial cross-sectional view of the absorber 220 is also shown in FIG. 7B. The absorber 220 has a proximal end 231 and a distal end 232, which may connect or attach to an exhaust system. The absorber 220 includes an outer layer 224, an inner layer 226 and an innermost layer 228 which are all capable of withstanding temperatures of 1000 F (538 C) or greater. For example, the various layers 224, 226, 228 are composed of metal (e.g., stainless steel, titanium, etc.), ceramic, carbon, glass, and/or composite material, as described further below. In this particular example, stainless steel forms the outer layer 224, glass wool forms the inner layer 226 and perforated stainless steel forms the innermost layer 228. Further, the absorber 220 attaches to the turbine housing 127 via a turbine flange 130 and an absorber flange 230. Flange attachments for attaching an absorber to a turbine housing may include use of gaskets, bonding material, bolts, etc.

Figure 8:
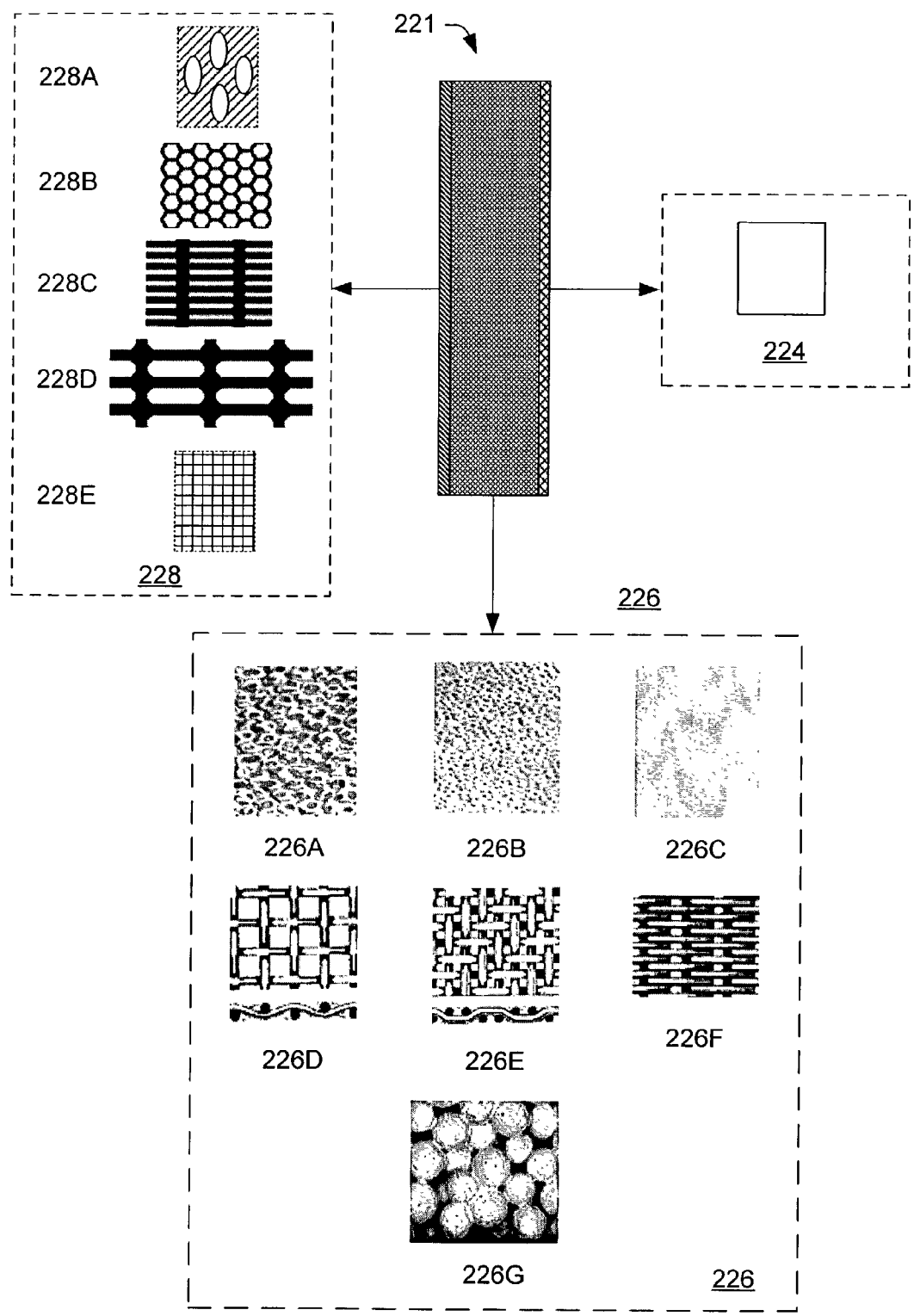
FIG. 8 is an approximate cross-sectional view of an exemplary absorber wall along with a variety of exemplary materials.

The various exemplary absorbers described above include an innermost layer, an inner layer and an outer layer which are all capable of withstanding temperatures of 1000 F (538 C) or greater. Referring to FIG. 8, further details of exemplary layers are shown with reference to a cross-section of an absorber wall 221. The cross-section of the absorber wall 221, includes an outer layer 224 (e.g., a conduit outer layer), a first inner or absorptive layer 226 (e.g., a first conduit inner layer) and a second inner layer 228 (e.g., a second conduit inner layer or an innermost conduit layer).

The outer layer 224 is optionally composed of stainless steel, another metal or composite or other material capable of withstanding temperatures of 1000 F (538 C) or greater. In general, an outer layer is impervious to exhaust flow and has a non-corrugated surface or substantially smooth surface. However, an exemplary absorber or turbine housing may include a corrugated outer layer wherein corrugations increase flexibility of the outer layer. Corrugations (e.g., periodic variations in outer layer diameter) may also act to reduce transmission of structure borne noise. Heat shield material and/or other material optionally contact at least part of the outer surface of the outer layer.

The first inner layer or absorptive layer 226 is optionally composed of a structured material, a woven material and/or a particulate material. For example, structured material includes metal foams and ceramic foams. In particular, structured material having at least some degree of reticulated and/or interconnected open cells is suitable for sound absorption. Often structured material absorbs pressure waves in a series of tortuous flow paths; hence, sound absorption by a structured material typically depends on cell or pore size, degree of interconnectedness, porosity, density, etc. FIG. 8 shows three different exemplary foams having pore densities of approximately 10 pores per inch (4 pores per cm) 226A, approximately 30 pores per inch (12 pores per cm) 226B and approximately 65 pores per inch (26 pores per cm) 226C. Material having even higher pore density (e.g., 800 pores per inch (315 pores per cm) or more) is also available commercially. Metal (e.g., metal or alloy) and ceramic structured material is available from Porvair Advanced Materials, Hendersonville, N.C. In particular, Porvair Advanced Materials can provide structured material in thicknesses up to 1.5 inch (3.8 cm), which is sufficiently thick to match at least some noise wavelengths generated by a turbine (see, e.g., above discussion on absorption and attenuation).

A woven material may have any of a variety of weaves. FIG. 8 shows three exemplary weaves: plain weave 226D, twill square weave 226E and Hollander weave 226F. Some of these woven materials have asymmetric patterns wherein selective orientation of a pattern in an inner layer may produce desirable results. For example, depending on the nature of one or more other inner layers, if present, orientation of a Hollander weave material may increase or reduce drag on exhaust flow. Exemplary, non-limiting woven wire mesh materials have wire diameters from approximately 0.0008 in. (0.02 mm) to approximately 0.08 in. (2 mm) or more, woven apertures from approximately 0.0008 in. (0.02 mm) to approximately 0.4 in. (10 mm) or more and open areas of approximately 10% to approximately 80% or more.

A particulate material may be a porous particulate or simply form a porous network. FIG. 8 also shows a sintered particulate material 226G composed of substantially spherical particles. Porous ceramic spheres are available commercially from 3M Corporation, St. Paul, Minn. and other sources. For example, MACROLITE® ceramic spheres (3M Corp.) can withstand temperatures up to 2,000 F and are available in sizes from approximately 0.01 inch (0.025 cm) to approximately 0.5 inch (1.27 cm). Various absorbers may use particulate material composed of metal. For example, hollow metal spheres are available commercially in diameters ranging from approximately 0.02 in. (0.05 cm) to 0.12 in. (0.3 cm).

The second inner layer 228 is optionally composed of a perforated material. A variety of exemplary perforations 228A, 228B, 228C, 228D, 228E are shown in FIG. 8. For example, a metal inner layer may have polygonal, circular, ellipsoidal, and/or other shaped perforations. Dimensions of such perforations may range from approximately 0.004 in. (0.01 cm) to approximately 1 in. (2.5 cm) or more. In general, individual inner layer perforations have a cross-sectional area that is larger than that of individual inner absorptive layer pores or cells. For example, an exemplary absorber has a first inner layer with approximately 0.2 in. (0.5 cm) square perforations and a second inner layer with approximately 0.04 in. (0.01 cm) dimensioned apertures. An exemplary innermost layer is composed of perforated stainless steel fashioned as a sleeve. Such an inner layer optionally has a thickness of approximately 0.05 in (1.3 mm).

An inner layer material and/or geometry thereof are optionally selected, at least in part, to protect another inner layer material from erosion caused by exhaust flow. For example, open area of an innermost layer is reduced by either reducing one or more perforation dimensions and/or reducing the number of perforations of an inner layer. Of course, such reductions should maintain an acceptable level of transmission of acoustic energy from the exhaust to an absorptive layer. For example, an exemplary inner layer material has an open percentage of approximately 30% to ensure adequate transmission of acoustic energy. Greater open percentages are possible; however, with greater open percentages, a decrease in erosion protection may result. In turn, smaller open percentages are also possible; however, with smaller open percentages, a decrease in acoustic energy transmission may result. Thus, an exemplary inner material and/or geometry thereof may be selected based on erosion protection and acoustic energy transmission to another inner layer.

Various exemplary absorbers shown in the figures include three layers (e.g., two inner layers and an outer layer). Of course, more or less layers are possible. Further, in general, the term "inner layer" refers to any specific layer positioned inner to an absorber's outer layer while the term "innermost layer" refers to an inner layer that is the innermost layer of an absorber.

Although some exemplary methods, devices and systems have been illustrated in the accompanying Drawings and described in the foregoing Detailed Description, it will be understood that the methods and systems are not limited to the exemplary embodiments disclosed, but are capable of numerous rearrangements, modifications and substitutions without departing from the spirit set forth and defined by the following claims.

What is claimed is:

1. A turbine housing for housing a turbine wheel, the turbine housing comprising:
   cylindrical wall having an cylindrical wall axis for coaxial alignment with a rotational axis of a turbine wheel;
   an integral exhaust outlet conduit that damps structural vibrations and absorbs acoustic energy wherein the integral exhaust outlet conduit comprises a proximal end having an axis coaxial to the cylindrical wall axis, wherein the integral exhaust outlet conduit holds an inner conduit layer disposed between a rigid metal outer conduit layer and an innermost conduit layer and wherein the inner conduit layer comprises at least one member selected from a group consisting of woven wire, glass, metal foam, ceramic foam, ceramic particles, and metal particles.

2. The turbine housing of claim 1, wherein the innermost conduit layer comprises perforated metal.

3. The turbine housing of claim 1 housing a turbine wheel and wherein the integral exhaust outlet conduit proximal end is positioned proximate to the turbine wheel.

4. The turbine housing of claim 3, wherein the inner conduit layer has a proximal end positioned proximate to the turbine wheel.

5. The turbine housing of claim 1, wherein the inner conduit layer is positionable within the integral exhaust outlet conduit.

6. An exhaust conduit to receive exhaust from a turbine, to receive structural vibrations from a housing of the turbine, to damp the structural vibrations and to absorb acoustic energy carried by the exhaust, the exhaust conduit comprising:
   an inner conduit layer comprising at least one member selected from a group consisting of woven wire, glass, metal foam, ceramic foam, ceramic particles, and metal particles; and
   a rigid outer conduit layer for housing the inner conduit layer and connecting the exhaust conduit to a turbine wherein the rigid outer conduit layer has a proximal end having an axis for coaxial alignment with a rotational axis of a turbine wheel of the turbine.

7. The exhaust conduit of claim 6, wherein the exhaust conduit connects directly to the turbine.

8. The exhaust conduit of claim 6, wherein the turbine comprises a turbine housing and a turbine wheel and the exhaust conduit connects directly to the turbine housing.

9. The exhaust conduit of claim 6, wherein the inner conduit layer comprises woven wire.

10. The exhaust conduit of claim 6, wherein the inner conduit layer resides between an innermost conduit layer and the rigid outer conduit layer.

11. The exhaust conduit of claim 10, wherein the innermost conduit layer comprises a rigid perforated material.

12. The exhaust conduit of claim 6, further comprising connection means for connecting the exhaust conduit to the turbine.

13. The exhaust conduit of claim 12, wherein the connection means comprises at least one member selected from a group consisting of a flange, a thread, one or more blades, and a compression fitting.

14. The exhaust conduit of claim 6 capable of withstanding temperatures equal to or greater than approximately 1000° F. (538° C.).

15. The exhaust conduit of claim 6, wherein the exhaust conduit reduces noise having frequencies greater than approximately 5,000 Hz at a temperature greater than approximately 1000° F. (538° C.).

16. The exhaust conduit of claim 6, wherein the inner conduit has a thickness determined, at least in part, by a turbine blade pass frequency.

17. The exhaust conduit of claim 6, wherein the inner conduit has a thickness determined, at least in part, by one or more frequencies and one or more exhaust temperatures.

18. The exhaust conduit of claim 6, wherein the turbine is part of a turbocharger.

19. An exhaust conduit for receiving exhaust from a turbine, the exhaust conduit comprising:
  a proximal end having an axis for coaxial alignment with a rotational axis of a turbine wheel of the turbine;
  a first inner conduit layer comprising perforated steel;
  a second inner conduit layer comprising woven wire; and
  a metal outer conduit layer to hold the first inner conduit layer and the second inner conduit layer, to connect the exhaust conduit to the turbine and to receive structural vibrations from the housing wherein the exhaust conduit damps the structural vibrations and absorbs acoustic enemy carried by the exhaust.

20. The exhaust conduit of claim 19, wherein the exhaust conduit connects to the turbine via a compression fitting.

21. The exhaust conduit of claim 19, wherein the outer conduit layer fits into an exhaust outlet of the turbine.

22. The exhaust conduit of claim 19, further comprising a heat shield.

23. The exhaust conduit of claim 22, wherein the heat shield comprises woven wire.

24. The exhaust conduit of claim 16, wherein the metal outer layer comprises corrugations.

25. A turbine housing for housing a turbine wheel, the turbine housing comprising:
  a cylindrical wall having a cylindrical wall axis for coaxial alignment with a rotational axis of a turbine wheel;
  an exhaust conduit that damps structural vibrations and absorbs acoustic energy, the exhaust conduit comprising a proximal end having an axis coaxial to the cylindrical wall axis, an impervious metal conduit layer, a perforated metal conduit layer wherein the impervious metal conduit layer substantially surrounds the perforated metal conduit layer and wherein the layers define a substantially annular space therebetween, and a sound absorbing material disposed in the substantially annular space.

26. The turbine housing of claim 25 wherein the impervious metal conduit layer comprises stainless steel.

* * * * *